United States Patent
Hidaka

(10) Patent No.: US 9,699,006 B1
(45) Date of Patent: Jul. 4, 2017

(54) SIGN-BASED ADAPTIVE CONTROL WITH AUTOMATICALLY-SELECTED FILTER PATTERNS

(71) Applicant: FUJITSU LIMITED, Kawasaki-shi, Kanagawa (JP)

(72) Inventor: Yasuo Hidaka, Cupertino, CA (US)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/968,621

(22) Filed: Dec. 14, 2015

(51) Int. Cl.
H04L 25/03 (2006.01)
H04L 12/26 (2006.01)

(52) U.S. Cl.
CPC .... H04L 25/03006 (2013.01); H04L 43/0823 (2013.01); H04L 25/03038 (2013.01); H04L 25/03057 (2013.01); H04L 2025/0349 (2013.01)

(58) Field of Classification Search
CPC .............. H04L 25/03057; H04L 25/03038
See application file for complete search history.

(56) References Cited

U.S. PATENT DOCUMENTS

| | | | |
|---|---|---|---|
| 7,760,798 B2 | 7/2010 | Hidaka | |
| 2005/0219985 A1* | 10/2005 | Nakahira | G11B 20/10009 369/59.13 |
| 2007/0280341 A1* | 12/2007 | Hidaka | G01D 21/00 375/229 |
| 2009/0232196 A1* | 9/2009 | Sunaga | H04L 25/03057 375/233 |
| 2009/0316767 A1 | 12/2009 | Hidaka | |
| 2009/0316771 A1 | 12/2009 | Hidaka | |
| 2014/0064351 A1 | 3/2014 | Hidaka | |

* cited by examiner

Primary Examiner — Janice Tieu
(74) Attorney, Agent, or Firm — Maschoff Brennan

(57) ABSTRACT

A method of selecting filter patterns is provided. The method may include measuring an average sign value of aggregate inter-symbol interference (ISI) for a data sequence using multiple filter pattern combinations of multiple filter patterns; estimating a first analog level of aggregate ISI for a first filter pattern based on a first average sign value, and a second analog level of aggregate ISI for a second filter pattern based on a second average sign value; estimating an analog level of individual ISI of the first filter pattern pair based on the first analog level and the second analog level; estimating, for each possible filter pattern combination, an analog level of aggregate ISI for the first filter pattern pair; and selecting a filter pattern combination for the first filter pattern pair that reduces the analog level of aggregate ISI.

20 Claims, 10 Drawing Sheets

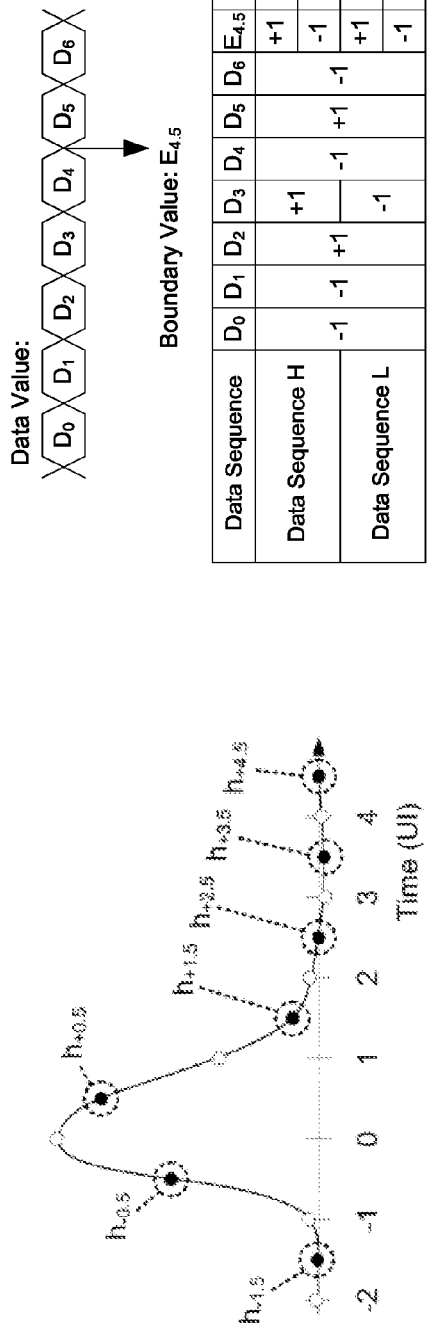
Figure 3a
Figure 3b
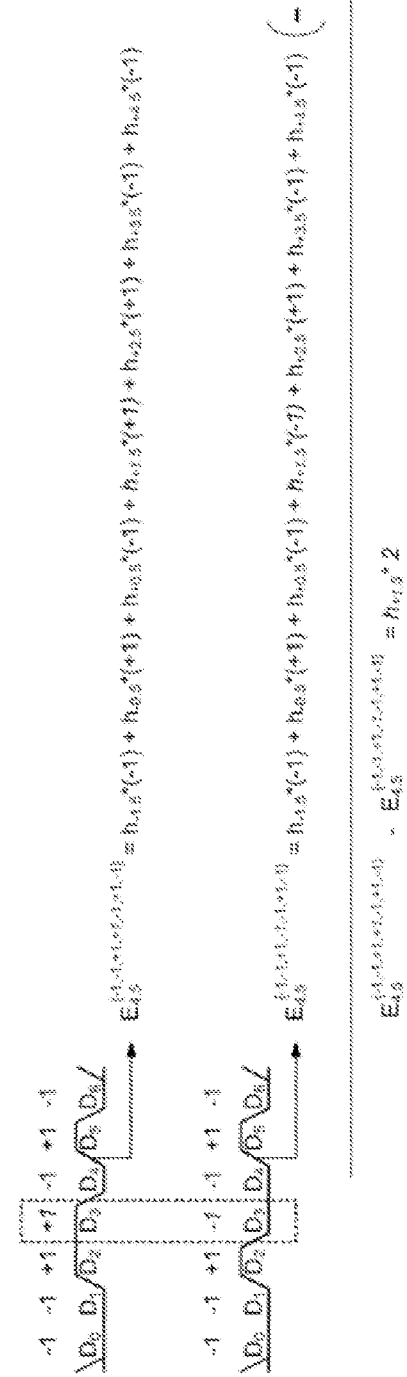
Figure 4

800
802
EFP₁
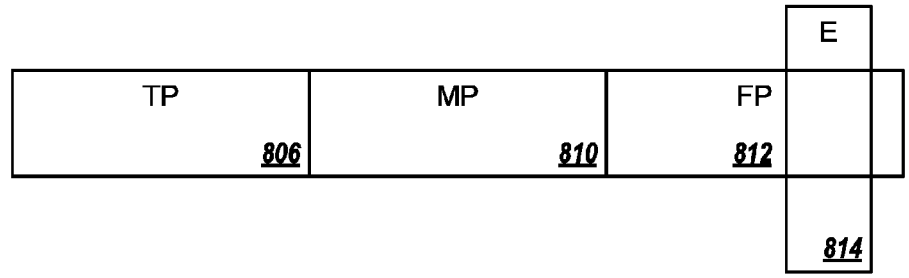
804
EFP₀
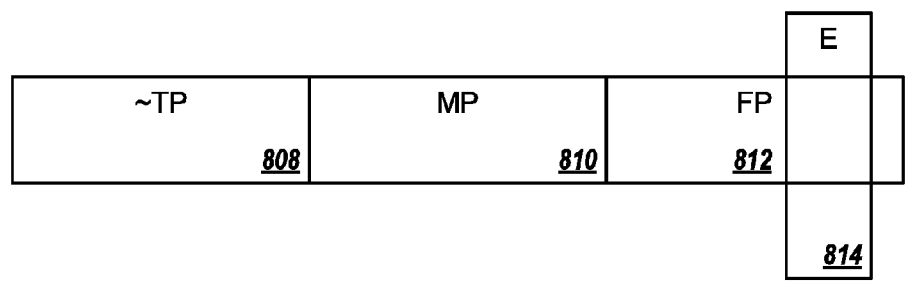
EFP: Extended filter pattern
FP: Fixed sequence of 0's and 1's with balanced ISI
MP: (Nearly) balance number of 0's and 1's
TP: Significantly more 1's than 0's OR significantly more 0's than 1's
~TP: Opposite of TP
Figure 8

| filter pattern | | κ | | | | aggregate ISI | | individual ISI |
|---|---|---|---|---|---|---|---|---|
| $i$ | label | 1 | 2 | 3 | 4 | avg sign | analog level | analog level |
| 1 | $FP1^{(1)}$ | +1 | $FPC_2^{(1)}$ | $FPC_3^{(1)}$ | $FPC_4^{(1)}$ | $\eta_{FP1}^{(1)}$ | $q_{FP1}^{(1)}$ | $q_{FPD}^{(1)}$ |
| 1 | $FP0^{(1)}$ | −1 | | | | $\eta_{FP0}^{(1)}$ | $q_{FP0}^{(1)}$ | |
| 2 | $FP1^{(2)}$ | $FPC_1^{(2)}$ | +1 | $FPC_3^{(2)}$ | $FPC_4^{(2)}$ | $\eta_{FP1}^{(2)}$ | $q_{FP1}^{(2)}$ | $q_{FPD}^{(2)}$ |
| 2 | $FP0^{(2)}$ | | −1 | | | $\eta_{FP0}^{(2)}$ | $q_{FP0}^{(2)}$ | |
| 3 | $FP1^{(3)}$ | $FPC_1^{(3)}$ | $FPC_2^{(3)}$ | +1 | $FPC_2^{(1)}$ | $\eta_{FP1}^{(3)}$ | $q_{FP1}^{(3)}$ | $q_{FPD}^{(3)}$ |
| 3 | $FP0^{(3)}$ | | | −1 | | $\eta_{FP0}^{(3)}$ | $q_{FP0}^{(3)}$ | |
| 4 | $FP1^{(4)}$ | $FPC_1^{(4)}$ | $FPC_2^{(4)}$ | $FPC_3^{(4)}$ | +1 | $\eta_{FP1}^{(4)}$ | $q_{FP1}^{(4)}$ | $q_{FPD}^{(4)}$ |
| 4 | $FP0^{(4)}$ | | | | −1 | $\eta_{FP0}^{(4)}$ | $q_{FP0}^{(4)}$ | | measure → inverse error function → difference estimated individual ISIs are used for optimizing other filter patterns optimization of filter patterns:

| individual ISI | $q_{FPD}^{(1)}$ | $q_{FPD}^{(2)}$ | $q_{FPD}^{(3)}$ | $q_{FPD}^{(4)}$ |

Figure 10

SIGN-BASED ADAPTIVE CONTROL WITH AUTOMATICALLY-SELECTED FILTER PATTERNS

FIELD

The embodiments described are related to adaptive control, and more specifically, to selection of filter patterns for adaptive equalizer control.

BACKGROUND

In high-speed electrical communication, a received signal may often be distorted due to frequency-dependent loss, such as for example skin effect and dielectric loss, causing inter-symbol interference (ISI). Equalizers may be used to compensate for ISI to increase maximal channel length or increase communication speed.

The subject matter claimed herein is not limited to embodiments that solve any disadvantages or that operate only in environments such as those described above. Rather, this background is only provided to illustrate one example technology area where at least one embodiment described herein may be practiced.

SUMMARY

At least one embodiment of the present disclosure may include a method to select filter patterns. The method may include measuring an average sign value of an aggregate inter-symbol interference (ISI) for a data sequence using multiple filter pattern combinations of multiple filter patterns. The method may also include estimating a first analog level of aggregate ISI for a first filter pattern based on a first average sign value and estimating a second analog level of aggregate ISI for a second filter pattern based on a second average sign value. The method may further include estimating an analog level of individual ISI of the first filter pattern pair based on the first analog level and the second analog level and estimating, for each possible filter pattern combination, an analog level of aggregate ISI for the first filter pattern pair. The method may also include selecting a filter pattern combination for the first filter pattern pair that reduces the analog level of aggregate ISI.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which:

FIG. 3a illustrates an example pulse response of an example transmission channel;

FIG. 3b illustrates two example filter patterns H and L for detecting ISI at 1.5 UIs of delay;

FIG. 4 illustrates example detection of ISI based on one or more error-value differences between two filter patterns;

FIG. 8 illustrates example embodiments of a pair of extended filter-patterns configured to detect long-term ISI;

FIG. 10 illustrates an example data flow during filter pattern selection; and

DESCRIPTION OF EMBODIMENTS

In high-speed electrical communication, a received signal is often distorted due to frequency-dependent loss such as skin effect and dielectric loss, which may cause inter-symbol interference (ISI). To compensate for ISI, equalization may be used to counteract effects on the signal. Some equalization techniques may include creating a filter pattern and/or an extended filter pattern to aid in cancelling the effects of ISI on the signal. Conventional techniques, however, typically include manually creating and selecting a filter pattern. Further, conventional techniques may not include optimizing a particular filter pattern based on the signal and/or equalizer characteristics.

Aspects of the present disclosure may, in some embodiments, address these and other shortcomings of some conventional techniques by providing sign-based adaptive control with automatically-selected filter patterns. In at least one embodiment in the present disclosure, a method to select filter patterns may include measuring an average sign value of an aggregate inter-symbol interference (ISI) for a data sequence using multiple filter pattern combinations of multiple filter patterns. The method may also include estimating a first analog level of aggregate ISI for a first filter pattern based on a first average sign value and estimating a second analog level of aggregate ISI for a second filter pattern based on a second average sign value. The method may further include estimating an analog level of individual ISI of the first filter pattern pair based on the first analog level and the second analog level and estimating, for each possible filter pattern combination, an analog level of aggregate ISI for the first filter pattern pair. The method may also include selecting a filter pattern combination for the first filter pattern pair that reduces the analog level of aggregate ISI. In some embodiments, the techniques described herein may provide more efficient and effective filter patterns that are automatically generated and optimized. Embodiments of the present disclosure are explained with reference to the accompanying drawings.

Figure 1:
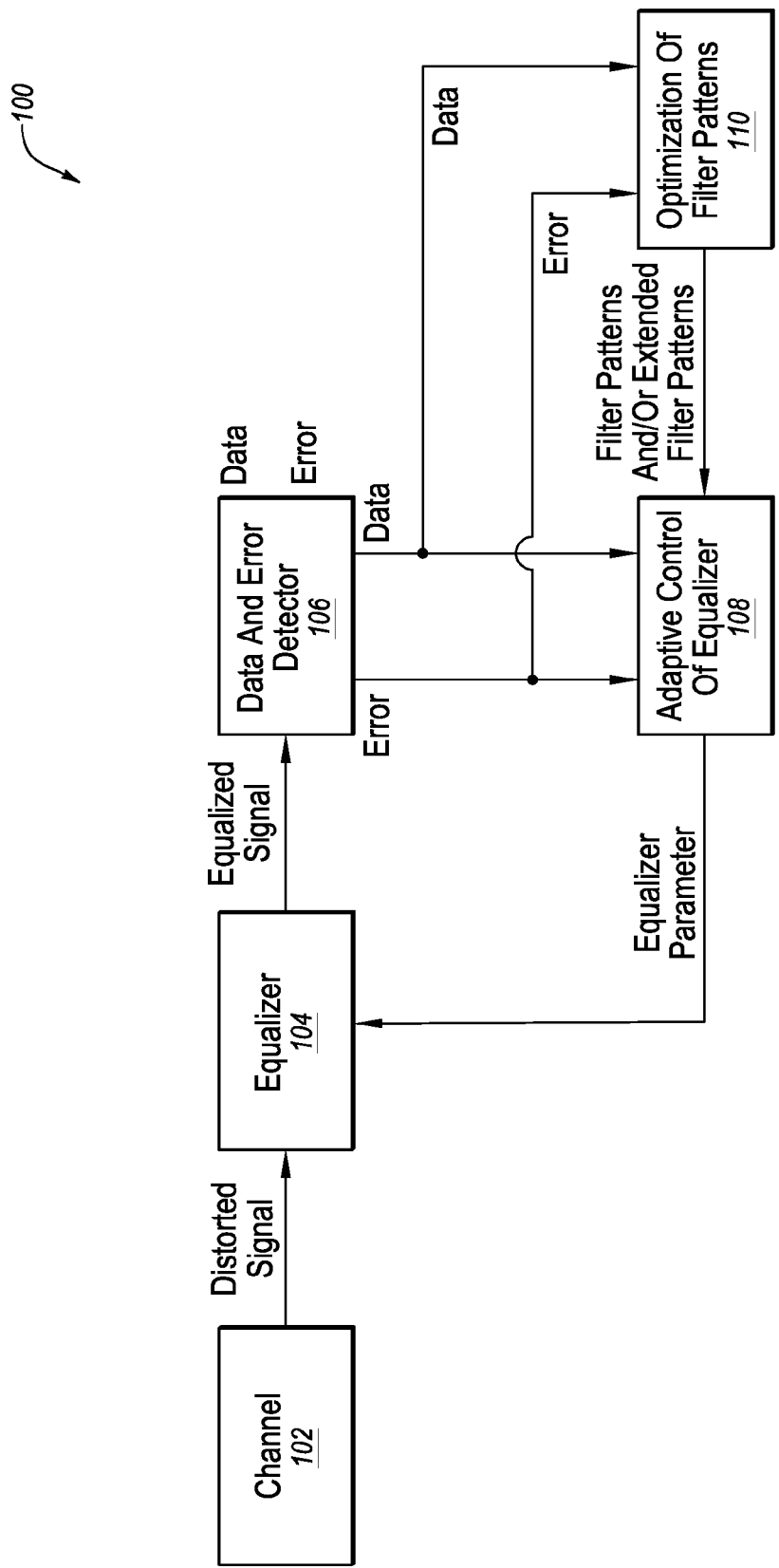
FIG. 1 is a diagram representing an example adaptive control system.

FIG. 1 is a system block diagram of an example adaptive control system 100 that includes one or more equalizers 104. In at least one embodiment, the adaptive control system 100 may include an adaptive equalizer 104 after or before channel 102.

A channel 102 may be configured to communicate a signal from a transmitter to a receiver, such as at the equalizer 104. The signal may include some distortion or interference, such as ISI. The equalizer 104 may amplify an attenuated high-frequency component of the received signal to reduce ISI. The channel 102 may be communicatively coupled to an equalizer 104 and configured to transmit the distorted signal with ISI.

The equalizer 104 may be any equalizer configured to reduce ISI and accept parameters to adjust its operation. For example, the equalizer 104 may be one or more of a linear equalizer (LE) or a decision-feedback equalizer (DFE) or a feed-forward equalizer (FFE). The equalizer 104 may be configured to reduce ISI. The equalizer 104 may be communicatively coupled to a data and error detector 106 and configured to transmit the equalized signal.

The data and error detector 106 may determine data and error in relation to ISI of the equalized signal. The data and error detector 106 may be communicatively coupled to an adaptive equalizer controller 108 (which may be used as adaptive control of an equalizer) and to send the error and data of the equalized signal.

The adaptive equalizer controller 108 may be configured to determine parameters for the operation of the equalizer 104 based on filter pattern matching of received error and data information. The adaptive equalizer controller 108 may use one or more finite state machines to implement filter patterns for reducing short-term ISI and extended filter patterns for reducing long-term ISI. The data and error detector 106 and the adaptive equalizer controller 108 may both be communicatively coupled to a filter pattern optimizer 110. The data and error detector 106 may send data and error to the filter pattern optimizer 110 (which may be used for optimization of filter patterns).

The filter pattern optimizer 110 may use the data and error to generate, and select filter patterns and/or extended filter patterns. The filter pattern optimizer 110 may send optimized filter patterns and/or optimized extended filter patterns to the adaptive equalizer controller 108.

The adaptive equalizer controller 108 may be configured to use the optimized filter patterns and/or the optimized extended filter patterns to determine parameters for the operation of the equalizer 104 based on filter pattern matching and/or extended filter pattern matching of received error and data information. The adaptive equalizer controller 108 may be communicatively coupled to the equalizer 104 to provide such equalizer parameters. The equalizer 104 may be configured to adjust its operation based on the received equalizer parameters.

Figure 2:
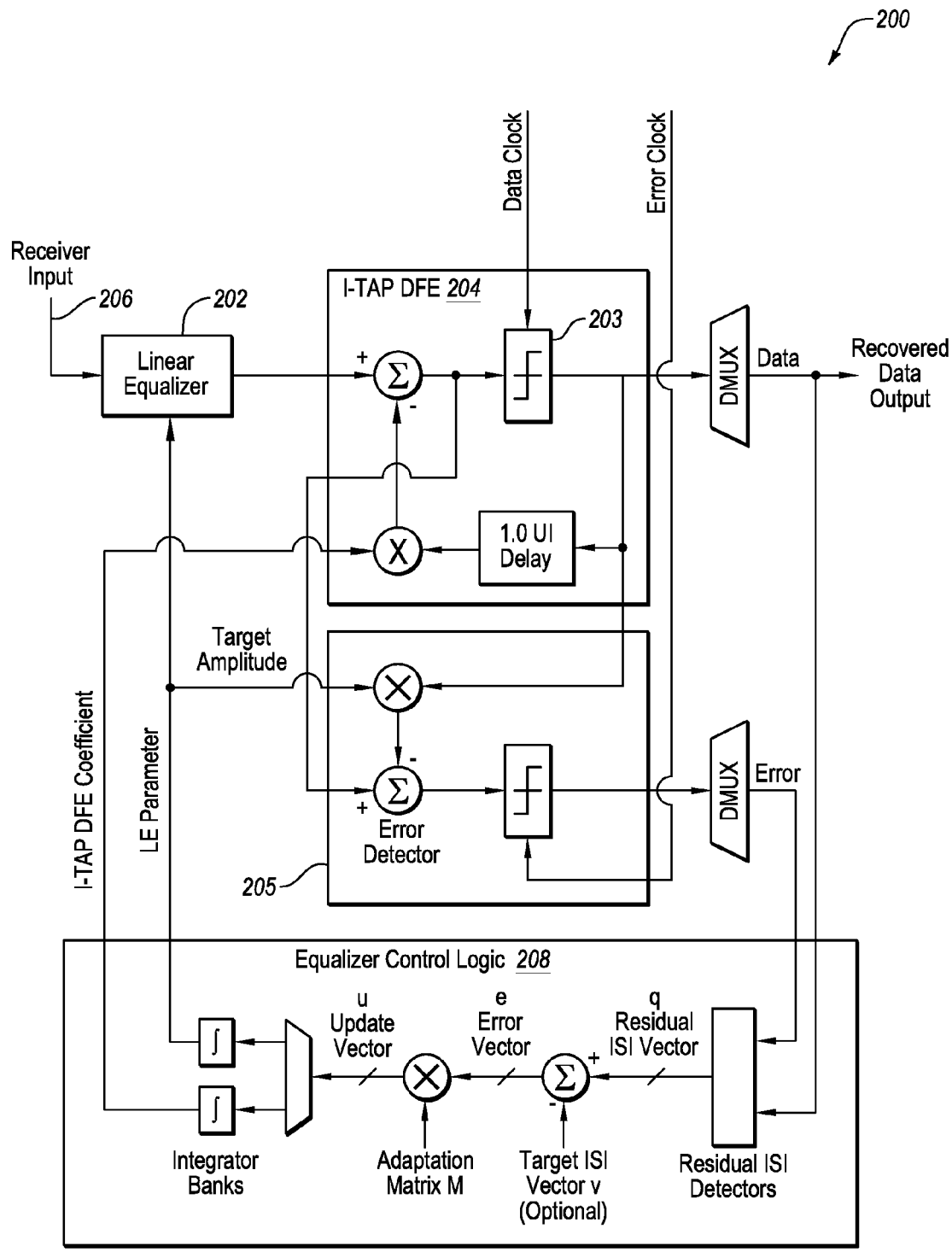
FIG. 2 is a diagram representing an example adaptive control system that may include a linear equalizer ("LE"), and a decision feedback equalizer ("DFE")

FIG. 2 is a diagram representing an example adaptive control system 200 that may include a linear equalizer ("LE") 202, a decision feedback equalizer ("DFE") 204, and an error detector 205. The adaptive control system 200 may include any equalizer or combination of equalizers for receiving, at an input port 206, a signal from a transmitter and applying a gain, offset, or other modification to the signal according to parameters that specify an amount of compensation to apply to the signal. Such parameters may be adaptive. The receiver may also include equalizer control logic 208 for adjusting such parameters. U.S. Pat. No. 7,760,798, entitled System and Method for Adjusting Compensation Applied to a Signal and issued 20 Jul. 2010, which is incorporated herein by reference, further describes adjusting equalizer parameters to compensate for signal distortion. One or more of the equalizers in the adaptive control system 200 may use a feedback parameter and apply compensation specified by the feedback parameter to the signal from the transmitter to compensate for distortion in the signal. The present disclosure may refer to circuit components applying compensation for distortion in a signal as being part of an adaptive equalizer or an adaptive equalizer control system. For example, in FIG. 2, an adaptive control system 200 includes the LE 202 and the DFE 204 to provide two-dimensional adaptive equalizer control.

In at least one embodiment, the adaptive control system 200 may use adaptive control based on one or more adaptive control algorithms, such as, for example, a Least-Mean-Square (LMS) algorithm, a Sign-Sign-Least-Mean-Square (SS-LMS) algorithm, or a Zero-Forcing (ZF) algorithm. As another example, particular embodiments may utilize a sign-based ZF algorithm that does not require measuring quantities of residual ISI. In particular embodiments, LEs (in addition to DFEs) may utilize one or more adaptive control algorithms.

In at least one embodiment, the LE 202 may reduce ISI with greater than or equal to approximately 2.0 UIs of delay. If the LE 202 applies too little compensation, the pulse response may include ISI greater than zero over multiple UIs of delay. For example, the pulse response may demonstrate ISI greater than zero over approximately 2.5, 3.0, and 3.5 UIs of delay. On the other hand, if an LE applies too much compensation, the pulse response may include ISI less than zero over multiple UIs of delay. The particular components chosen for an adaptive control system may depend on one or more characteristics of the transmission channel. For example, communication through particular transmission channels may benefit only slightly, if at all, from the use of an LE.

As illustrated, the DFE 204 is a 1-tap DFE. A 1-tap DFE may use a feedback loop from a decision circuit 203 in the DFE 204 to cancel ISI occurring after a delay of 1.0 UI. In particular embodiments, the LE 202 and 1-tap DFE 204 may apply compensation that reduces and cancels residual ISI occurring after particular unit intervals of delay.

As illustrated, the error detector 205 may generate an error value from the input and the output of the decision circuit 203 by subtracting a product of a target amplitude and the output of the decision circuit 203 from the input of the decision circuit 203.

As illustrated, output of the 1-tap DFE 204 (e.g., data) and output of the error detector 205 (e.g., error) may be demultiplexed and then used by equalizer-control logic 208. The demultiplexed data is used as the recovered data output.

The equalizer-control logic 208 may receive the recovered data output and the error and may generate and transmit equalizer parameters for controlling the amount of compensation for an equalizer to apply. In particular embodiments, equalizer-control logic 208 uses one or more residual ISI detectors to detect a residual ISI vector from the demultiplexed data and error and uses integrators to generate equalizer parameters. As used herein, the phrase "residual ISI" may refer to one or more "residual ISI vectors" or one or more vector values of residual ISI vectors, except where a particular "residual ISI component" is specified. A residual ISI vector may be produced using any mathematical operations that produce vector output from any type of data, such as, for example, scalar data and vector data, and may have any length. Mathematical operations used to produce vector values may be performed any number of times to produce any number of vector values for any number of vectors. In particular embodiments, the equalizer-control logic 208 may use additional hardware such as a monitoring circuit to adaptively control equalizer parameters. Alternatively, the equalizer-control logic 208 may adaptively control the equalizer parameters using a scheme that does not use additional hardware such as a monitoring circuit. The equalizer-control logic 208 may adaptively control any suitable control parameter such as, for example, an LE parameter, a 1-tap DFE coefficient, LE gain, and offset code, or any combination of suitable control parameters.

In at least some embodiments, the equalizer-control logic 208 may include an adaptation matrix, M. For example, the equalizer-control logic 208 may force residual ISI toward zero by detecting residual ISI and integrating each residual ISI component with a different weight according to the adaptation matrix, where weight depends on at least the equalizer type and the residual ISI. In particular embodiments, the equalizer-control logic 208 may include a vector of binary values representing the sign (e.g., +, −) of residual ISI components. In particular embodiments, equalizer-control logic 208 may be compatible with any correlated data sequences, including monotone sequences (such as a repeated 0-1-0-1 pattern).

In at least one embodiment, the equalizer-control logic 208 may be implemented using techniques such as General Zero-Forcing or Gauss-Newton algorithms. With General Zero-Forcing algorithms, the adaptation matrix may be calculated as a Jacobian (derivative) matrix of the impulse response (or the residual ISI vector) of the worst-case channel and the equalizer combined together with respect to the vector of equalizer parameters. For the worst-case channel, it may reduce the sum of squares of the residual ISI in the equilibrium state. For other channels, the sum of squares of the residual ISI may not necessarily be reduced in the equilibrium state, but the operating margin may usually be bigger than the worst-case channel for a wide range of channel characteristics.

In at least one embodiment, the equalizer-control logic 208 may use a sign-based method to implement a modified General Zero-Forcing or Gauss-Newton algorithm. In at least one embodiment, the sign-based method may be configured to achieve statistically equivalent results to the results of the non-modified General Zero-Forcing or Gauss-Newton algorithm in a long term. To implement the sign-based method, equalizer-control logic 208 may measure only sign information, and may calculate the quantity for each component of the residual ISI vector using only the sign information. Then, equalizer-control logic 208 performs arithmetic and scalar operations using the residual ISI vector to generate equalizer parameters. The description below with respect to FIG. 5 further describes equalizer-control logic 208 using a sign-based General Zero-Forcing method for adaptive equalizer control.

Although the present disclosure may describe and illustrate particular equalizers including particular combinations of particular components for particular adaptive control using particular adaptive control algorithms, the present disclosure contemplates any suitable equalizer including any suitable combinations of any suitable components for any suitable adaptive control using any suitable adaptive control algorithms including any two-dimensional equalizer, any DFE, any LE, any continuous-time linear equalizer (CTLE), or any low-frequency equalizer (LFE). As an example and not by way of limitation, particular embodiments may use adaptive control that is based on one or more adaptive control algorithms, such as, for example, a Least-Mean-Square (LMS) algorithm, a Sign-Sign-Least-Mean-Square (SS-LMS) algorithm, or a Zero-Forcing (ZF) algorithm.

FIG. 3a illustrates an example pulse response of an example transmission channel. The transmission channel may communicate a signal from a transmitter to a receiver that includes an equalizer, which may process the received signal. The equalizer may communicate the processed signal in any suitable manner to a decision circuit or any other circuit components. After transmission over the transmission channel, the received signal (or pulse) may have a long tail due to high-frequency loss in the transmission channel. The long tail may cause inter-symbol interference ("ISI") because the long tail may interfere with successively transmitted symbols.

In some embodiments, there may be two symbols that may be transmitted, such as the set of (0 and 1) or (−1 and +1). In such embodiments, the "0" or "−1" may represent logical zero or "false" values, while the "1" may represent logical one or "true" values. In other embodiments, three symbols may be used, such as the set of (0, 1, and 2) or (−2, 0, and +2). In yet other embodiments, four symbols may be used, such as the set of (0, 1, 2, and 3) or (−3, −1, +1, and +3). The present disclosure contemplates any suitable number of symbols. The equalizer may cancel the ISI. The equalizer may use a feedback loop from a decision circuit in the equalizer to cancel ISI occurring after particular unit intervals (UI) of delay, such as a delay of 1.0 UI.

The receiver may include any suitable equalizer or combination of equalizers for receiving, at an input port, the signal from the transmitter and applying a gain, offset, or other modification to the signal according to parameters that specify an amount of compensation to apply to the signal. Such parameters may be adaptive, which may be desirable when one or more characteristics of the transmission channel are unknown.

In some embodiments, one or more of the equalizers in the receiver may use a feedback parameter. In these and other embodiments, the feedback parameter may be used by applying compensation specified by the feedback parameter to the signal from the transmitter to compensate for distortion in the signal. The feedback parameter may be generated based on one or more filter patterns. The present disclosure may refer to circuit components, which apply compensation for distortion in a signal, as being part of an adaptive equalizer or an adaptive equalizer control system. Reference to an adaptive equalizer may encompass an adaptive equalizer control system, and vice versa, where appropriate.

FIG. 3b illustrates two example filter patterns (e.g., data sequence) H and L for detecting ISI at 1.5 UIs of delay ($h_{+1.5}$). The filter patterns H and L may be composed of two data symbols +1 and −1 that are successively transmitted in an order as illustrated in FIG. 3b.

Filter patterns H and L may be sampled alternatively and, over a given time period, the two filter patterns H and L may be sampled approximately the same number of times. In some embodiments, the two filter patterns may behave in opposite manners regarding the polarity of error values. In some embodiments, a statistical difference of the error values between two filter patterns, which may be sampled approximately the same number of times, may correspond to an actual difference of the error values between the two filter patterns over a long term for any incoming data sequence, even if filter pattern H is received much more frequently than filter pattern L. Once the ISI is detected, systems described may adjust the feedback parameters to the equalizers to cancel the ISI.

FIG. 4 illustrates example detection of ISI based on one or more error-value differences between two filter patterns. In at least one embodiment, ISI may be measured by taking a difference in error values between two filter patterns that have different data values in the data bits corresponding to the ISI to be measured. In the illustrated example, $h_{+1.5}$ may be measured by taking a difference in error values $E_{4.5}$ between $D_4$ and $D_5$ for two filter patterns which have different data values at $D_3$. Data values $D_0$, $D_1$, $D_2$, $D_4$, $D_5$ and $D_6$ may be the same for both filter patterns. Each data value and error value may include a low value, a high value, or a random value that takes either a high value or a low value randomly. In some embodiments, each data value and error value may include a quantity, which may be measured, for example, at a full-range precision analog level. In at least one embodiment, the sign (not the quantity) of the error values may be used to measure the error-value differences.

In at least one embodiment, ISI may, to some degree, be measured for its sign and for its magnitude by taking statistical differences of the binary error values for the two filter patterns. For example, the probabilities of +1 (or −1) error values may be the same for the two filter patterns in FIG. 4, if the ISI $h_{+1.5}$ is absolutely zero. Otherwise, the probability of +1 error values may be higher (or lower) for the filter pattern with $D_3$ equal to +1 than the filter pattern with $D_3$ equal to −1, depending on whether the ISI at 1.5 UIs of delay ($h_{+1.5}$) is positive (or negative). The amount of statistical difference of the binary error values for the two filter patterns may indicate the magnitude of the ISI at 1.5 UIs of delay ($h_{+1.5}$). For example, when the ISI at 1.5 UIs of delay ($h_{+1.5}$) becomes positive with higher (or lower) magnitude, the difference between the probability of +1 error values for the filter pattern with $D_3$ equal to +1 and the probability of +1 error values for the filter pattern with $D_3$ equal to −1 becomes positive with higher (or lower) magnitude.

If the binary error values are statistically saturated, the difference in binary error values between the two filter patterns is zero and may not be used to measure ISI. To prevent statistical saturation of the binary error values between the two filter patterns, a magnitude of aggregate ISI of the common part of the two filter patterns may be reduced. To reduce the magnitude of aggregate ISI of the common part of the two filter patterns, the data values of the common part of the two filter patterns may be approximately balanced. For example, the number of high values present in the common part of the two filter patterns (e.g., the data values that may be the common part of the two filter patterns, $D_0$, $D_1$, $D_2$, $D_4$, $D_5$ and $D_6$ in FIG. 4) used to calculate the difference in binary error values between the two filter patterns may be close to (and thus balanced with) the number of low values present in the common part of the two filter patterns (e.g. $D_0$, $D_1$, $D_2$, $D_4$, $D_5$ and $D_6$ in FIG. 4) used to calculate the difference in binary error values between the two filter patterns. The aggregate ISI of the common part of the two filter patterns or two extended filter patterns (e.g., $D_0$, $D_1$, $D_2$, $D_4$, $D_5$ and $D_6$ in FIG. 4) may be referred to as "μ." In at least one embodiment, μ may be represented as $h_{-1.5}*(-1)+h_{-0.5}*(+1)+h_{+0.5}*(-1)+h_{+2.5}*(+1)+h_{+3.5}*(-1)+h_{+4.5}*(-1)$. Filter patterns and extended filter patterns may be most effective when the magnitude of the aggregate ISI of the common part of the filter patterns ("μ") is reduced.

In at least one embodiment, balanced application of filter patterns may enable adaptive control algorithms to provide consistent or the most consistent adaptation results among various data sequences. Balanced application of filter patterns may be achieved by selecting filter patterns in a balanced manner. In at least one embodiment, if data sequences observed during adaptation are limited, the filter patterns for ISI detection may be chosen from those data sequences observed during adaptation.

Figure 5:
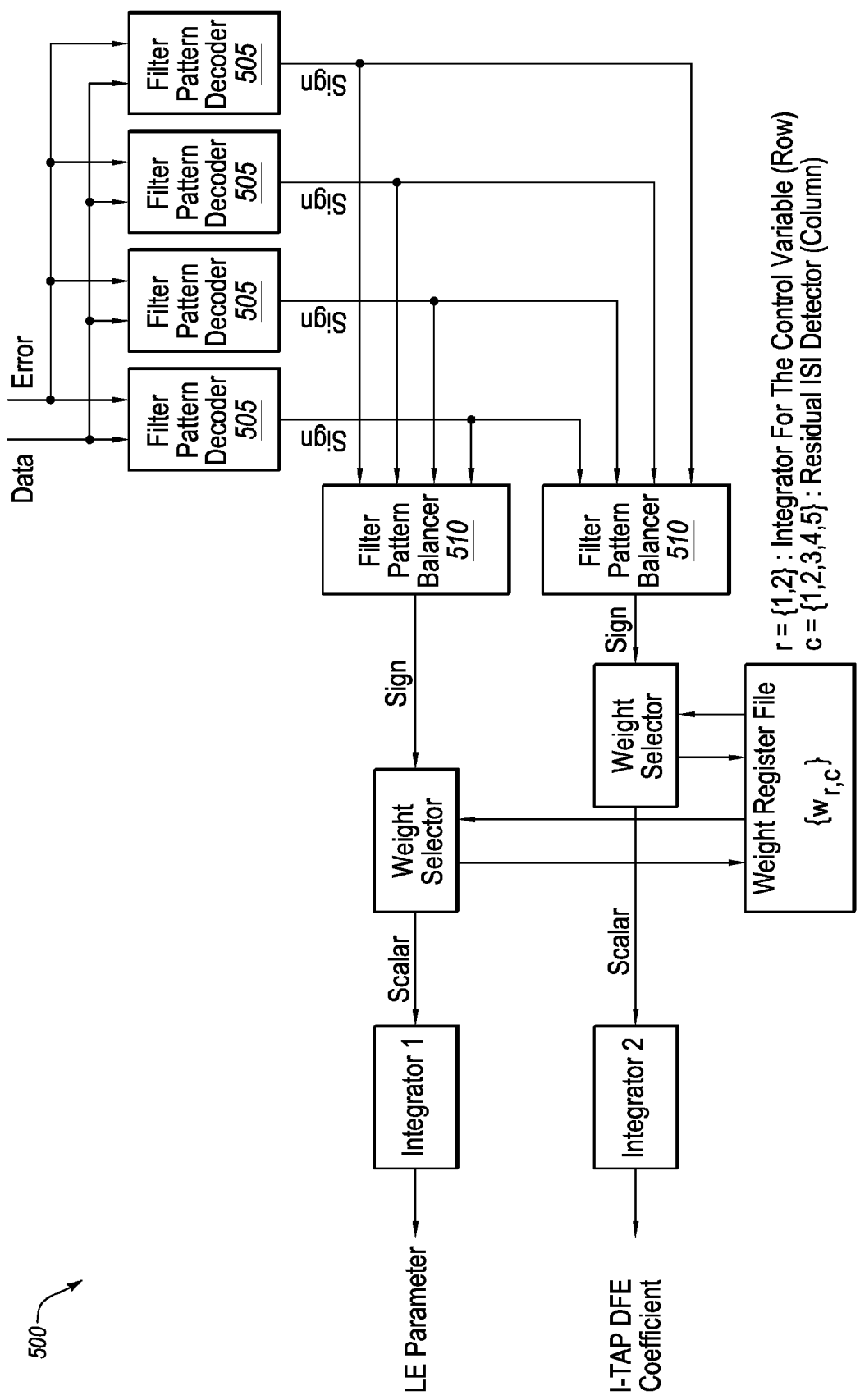
FIG. 5 illustrates example equalizer-control logic using an example sign-based method.

FIG. 5 illustrates example equalizer-control logic 500 using an example sign-based method. The example equalizer-control logic may use a sign-based method to implement a modified General Zero-Forcing or Gauss-Newton algorithm. In at least some embodiments, the sign-based method of FIG. 5 may be configured to achieve statistically equivalent results to the results of the General Zero-Forcing or Gauss-Newton algorithm in a long term. The description above with respect to FIG. 2 further describes equalizer-control logic using a conventional General Zero-Forcing method for adaptive equalizer control and an example sign-based General Zero-Forcing method for adaptive equalizer control. The sign-based method may use sign of residual ISI in a binary form and may perform add and subtract operations instead of multiply operations.

One or more filter pattern decoders 505 (e.g., filter pattern decoders 1 through 4) may detect sign of residual ISI using the sign-based method. The filter pattern decoders 1 through 4 may switch between multiple sets of filter patterns. Each filter pattern decoder 505 may be programmed to detect sign of residual ISI using any filter patterns, data sequences or sets of filter patterns or data sequences in any format. For example, a first filter pattern decoder 1 may be programmed to detect sign of the ISI at 1.5 UIs of delay ($h_{+1.5}$) by implementing the filter pattern H and the filter pattern L as shown in FIG. 3b and taking statistical differences of the binary error value between the filter pattern H and the filter pattern L as illustrated in FIG. 4. A second filter pattern decoder 2 may be programmed to detect sign of the ISI at 2.5 UIs of delay ($h_{+2.5}$) by implementing two filter patterns H and L between which the values of $D_2$ in the truth table shown in FIG. 3b may be differentiated. Each filter pattern decoder 505 may use and switch between any interface modes and applications of adaptive control actions and operate during and switch between any periods of operation, such as during initialization, after initialization, and in use, because there may be different requirements such as available data sequences for adaptation and desired (or required) level of optimization.

The sign-based method may be more efficient and may use less hardware than adaptive control using conventional General Zero-Forcing or Gauss-Newton algorithms that measure quantity of residual ISI by an Analog-to-Digital Converter (ADC) and perform multiplication operations between a matrix and a vector. The sign-based method may add or subtract weight to the equalizer parameter depending on the sign of residual ISI. In at least one embodiment, the sign-based method may balance the number of operations between residual ISI components (and optionally between equalizer parameters). In at least one embodiment, the sign-based method may be implemented for any equalizer, including any two-dimensional equalizer, any DFE and any LE, such as a continuous-time linear equalizer (CTLE) with any equalizer parameter.

The equalizer-control logic 500 may include one or more filter pattern balancers 510. A filter pattern balancer 510 may select one filter pattern decoder 505 at a time, and may process two results (e.g., one for a filter pattern H and another for filter pattern L in FIG. 3b) from the selected filter pattern decoder 505. After the filter pattern balancer 510 processes two results from the selected filter pattern decoder 505, the filter pattern balancer 510 selects a next filter pattern decoder 505 in sequence or at random. In particular embodiments, in a long term, the filter pattern balancer 510 may take into account results from each filter pattern decoder 505 for the same number of times. This may be performed for any incoming data sequence, even if matching of the incoming data sequence with one filter pattern decoder 505 may occur quite often, whereas matching of the incoming data sequence with another filter pattern decoder 505 may be rare.

When a filter pattern decoder 505 selected by the filter pattern balancer 510 detects residual ISI, the weight selector may read out a weight value from a two dimensional weight register file indexed by the integrator (row) and the filter pattern decoder 505 (column). Then, according to the sign of the residual ISI, the weight value is added to or subtracted from the value of the equalizer parameter, which is either the LE parameter or the 1-tap DFE coefficient. The weight register file may be programmed to include information equivalent to the adaptation matrix.

Figure 6:
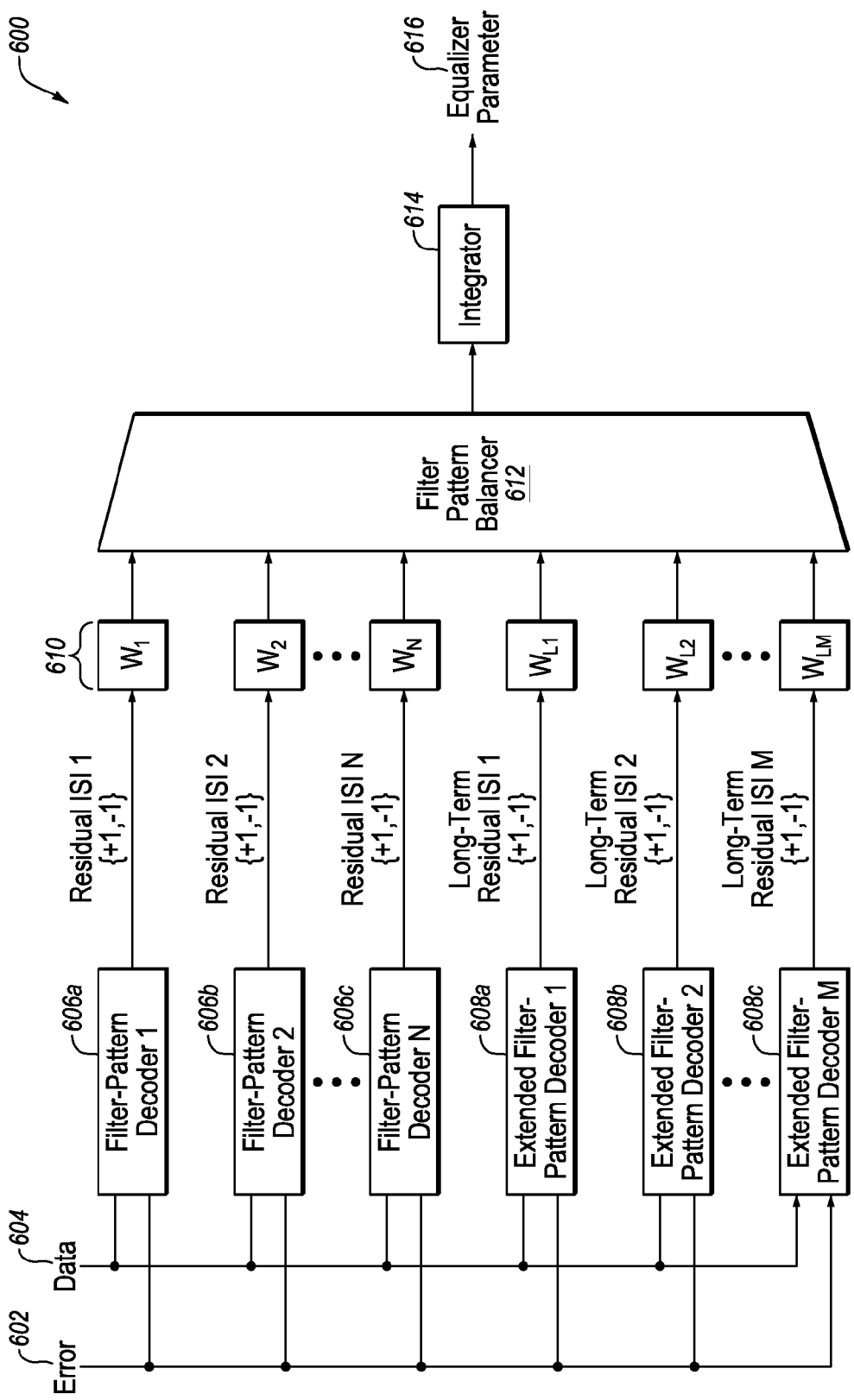
FIG. 6 illustrates a block diagram of an example embodiment of an adaptive equalizer controller.

FIG. 6 illustrates a block diagram of an example embodiment of an adaptive equalizer controller 600. In one embodiment, the adaptive equalizer controller 600 may be configured to use sign-based zero-forcing. The adaptive equalizer controller 600 may be implemented in part by one or more portions of the equalizer-control logic FIG. 5. In one embodiment, the adaptive equalizer controller 600 may include enhancements or additions to the equalizer-control logic of FIG. 5. The adaptive equalizer controller 600 may implement, for example, the adaptive equalizer controller 108 of FIG. 1, or any other adaptive equalizer controller.

The adaptive equalizer controller 600 may include inputs for error 602 and for data 604. Such error 602 and data 604 may be received from, for example, data and error detector 106 of FIG. 1.

In at least one embodiment, the adaptive equalizer controller 600 may include one or more filter-pattern decoders 606 configured to detect sign of short-term residual ISI. The adaptive equalizer controller 600 may include as many filter-pattern decoders 606 as necessary or desirable to adequately detect short-term residual ISI. Each of filter-pattern decoders 606 may be implemented, for example, by the filter pattern decoder 505 of FIG. 5. Each of filter-pattern decoders 606 may output sign values of short-term residual ISI.

The adaptive equalizer controller 600 may include one or more extended filter-pattern decoders 608. The adaptive equalizer controller 600 may include as many extended filter-pattern decoders 608 as necessary or desirable to adequately address long-term residual ISI. Each of the extended filter-pattern decoders 608 may be configured to detect long-term residual ISI. In one embodiment, each of the extended filter-pattern decoders 608 may be configured to detect sign of long-term residual ISI using the sign-based method. Each of the extended filter-pattern decoders 608 may be configured to detect long-term residual ISI using extended filter patterns for any suitable data patterns, data sequences or sets of data patterns or data sequences in any format. Example extended filter patterns are discussed in more detail within the context of FIG. 8 below. Each of the extended filter-pattern decoders 608 may utilize and switch between any interface modes and applications of adaptive control actions and operate during and switch between any periods of operation, such as during initialization, after initialization, and in use.

Each of the extended filter-pattern decoders 608 may be configured to output a sign value corresponding to the long-term residual ISI indicating whether its input indicates that the associated equalizer needs to increase or decrease its compensation of the signal for long-term ISI. In one embodiment, each of the extended filter-pattern decoders 608 may be configured to output: a "+1" if its input indicates that the associated equalizer is to increase its compensation; and a "−1" if its input indicates that the associated equalizer needs to decrease its compensation.

The adaptive equalizer controller 600 may include one or more weights 610 to apply to the output of filter pattern decoders 606 and/or extended filter-pattern decoders 608. Weights 610 may be configured to add or subtract a portion of the output equalizer parameter 616. Use of weights 610 may be configured to balance the effect of operations between residual ISI components and, optionally, between equalizer parameters. In one embodiment, weights 610 may be implemented fully or in part by the weight selectors and weight register file of FIG. 5. The selection of weights 610 may be made based on the type of equalizer for which equalizer parameters are created.

The adaptive equalizer controller 600 may include a filter pattern balancer 612 configured to further balance the effect of operations between filter-pattern decoders 606 and extended filter-pattern decoders 608 of adaptive equalizer controller 600. Filter pattern balancer 612 may thus enable adaptive control algorithms to provide consistent adaptation results among various data sequences. Filter pattern balancer 612 may be implemented in any suitable manner, including wholly or in part by a filter pattern balancer 510 of FIG. 5. The adaptive equalizer controller 600 may include an integrator 614 configured to integrate the results of filter pattern balancer 612. The integrator 614 may be configured to compile, normalize, or otherwise condition the results of filter pattern balancer 612 to generate an equalizer parameter 616 that is acceptable for use with an equalizer.

In one embodiment, the adaptive equalizer controller 600 may be implemented using only extended filter-pattern decoders. In such an embodiment, the adaptive equalizer controller 600 may be specifically configured to adaptively control an equalizer for long-term residual ISI. In another embodiment, filter pattern balancer 612 and weights 610 may be configured to adequately balance response for short-term residual ISI and long-term residual ISI. Thus, in such an embodiment, the adaptive equalizer controller 600 may be configured to adaptively control an equalizer for both short-term and long-term residual ISI.

Figure 7:
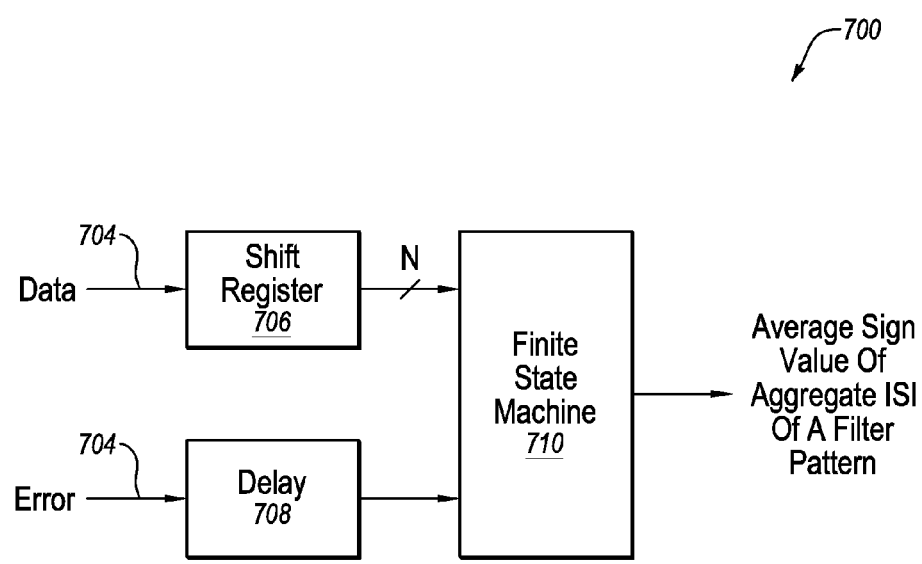
FIG. 7 illustrates a block diagram of an example embodiment of a filter-pattern decoder.

FIG. 7 illustrates a block diagram of an example embodiment of a filter-pattern decoder 700. In one embodiment, filter-pattern decoder 700 may implement one or more of the filter pattern decoders 505 of FIG. 5, one or more of the filter pattern decoders 606 or one or more of the extended filter-pattern decoders 608 of FIG. 6. Data 702 and error 704 may be received by filter-pattern decoder 700. A delay block 708 may delay the error 704 to compensate for various actions performed upon data 702. Filter-pattern decoder 700 may include a shift register 706 configured to separate data 702 into discretized portions which may be compared, matched, and evaluated by finite state machine 710.

Finite state machine 710 may be configured to match data 702 with a filter pattern to detect residual ISI and, once such matches are made, further use corresponding error 704 to determine an appropriate sign of residual ISI. Finite state machine 710 may be implemented in any suitable manner, such as by any suitable combination of analog or digital circuitry. In one example, finite state machine 710 may be implemented by instructions on a computer readable medium for execution by a processor. Finite state machine 710 may include one or more pairs of filter patterns or extended filter patterns for which finite state machine 710 is searching for matches within data 702. Such matches may provide the comparisons necessary to perform determinations of a sign of residual ISI. The configuration of finite state machine 710 may be represented by one or more truth tables.

FIG. 8 illustrates example embodiments of a pair of extended filter-patterns 802, 804 configured to detect long-term ISI. Extended filter-patterns ("EFP") 802, 804 may be used by adaptive control system 100 of FIG. 1 to evaluate the distorted signal. Extended filter-patterns 802, 804 may each include one or more logical sections, representing a portion of received data that is to be matched.

Each of the EFPs 802, 804 may include patterns corresponding to different portions of a data sequence. Such portions may include, for example, a filter pattern, a middle pattern, and a tail pattern. A filter pattern ("FP") may include a set of values before and after an error value. An error value, "E", may provide the detection of residual long-term ISI. An FP may be preceded by a middle pattern ("MP") and a tail pattern ("TP"). A TP may be referenced by an observed condition where ISI from TP on the detected error E may be caused by a long tail of a pulse response with long-term ISI.

In one embodiment, a set of matching EFPs may differ by the respective TP of each EFP. Thus, in the example of FIG. 8, $EFP_1$ 802 and $EFP_0$ 804 may each include the same FP 812 before and after the error value E 814, and include the same MP 810. However, $EFP_1$ 802 and $EFP_0$ 804 may include different TPs. Specifically, $EFP_1$ 802 may include a TP 806 that is the complement of ~TP 808 which may be included in $EFP_0$ 804. By subtracting E 814 in $EFP_0$ 804 from E 814 in $EFP_1$ 802, the effects from FP 812 and MP 810 on error E 814 are cancelled so that long-term ISI is detected as the effect from TP 806 and ~TP 808 on error E 814.

In one embodiment, $EFP_1$ 802 and $EFP_0$ 804 may each include a middle pattern such as MP 810. In another embodiment, $EFP_1$ 802 and $EFP_0$ 804 may not include a middle pattern. MP 810 may match with any data sequence which has a balanced number of data bits with differing values. For example, for data sequences with "0" s and "1" s, MP 810 may match with exactly or approximately the same number of "0" s and "1" s so that aggregate ISI for MP 810 is negligible. It may be assumed that ISI from most bits of MP 810 are similar to each other, having a similar order of magnitude and the same sign. Therefore, if the data sequence matched with MP 810 has exactly the same number of "0" s and "1" s then the aggregate ISI may be assumed to be negligible. Further, MP 810 may be configured to accept matching with an approximately equal number of "0" s and "1" s. The more differences between "0" s and "1" s allowed by MP 810, the less accurate the determination of ISI that may be made by $EFP_1$ 802 and $EFP_0$ 804. In one embodiment, MP 810 may be configured to accept matching with an equal number of "0" s and "1" s with an error range of plus or minus five percent. In another embodiment, the "0" s and "1" s matched with MP 810 may be unordered. Consequently, the probability of MP 810 matching with a random data sequence is high even with long sequences of MP 810. The efficiency of $EFP_1$ 802 and $EFP_0$ 804 may thus be increased by allowing a slightly unequal number of "0" s and "1" s which may increase the probability of MP 810 matching a random data sequence. This increase of efficiency may be made at the expense of degraded accuracy due to the difference between the number of "0" s and "1" s. However, by applying the same restrictions upon MP 810 in each of $EFP_1$ 802 and $EFP_0$ 804, the effect on ISI by the data sequence matched with MP 810 may be similar between $EFP_1$ 802 and $EFP_0$ 804.

The tail pattern of $EFP_1$ 802 or $EFP_0$ 804 may match with any data sequence which has significantly more "0" s than "1" s or significantly more "1" s than "0" s. Either such condition may cause the aggregate ISI from the data sequence matched with the tail pattern TP 806 or ~TP 808 to the error E 814 to have significant magnitude. The requirements for the relationship between the numbers of "0" s and "1" s may be swapped between $EFP_1$ 802 and $EFP_0$ 804 so that the aggregate ISI may have the opposite sign between $EFP_1$ 802 and $EFP_0$ 804. Consequently, while $EFP_1$ 802 may include TP 806, $EFP_0$ 804 may include ~TP 808 that may be a complement of TP 806. If TP 806 includes significantly more "0" s than "1" s, then ~TP 808 may include significantly more "1" s than "0" s. Conversely, if TP 806 includes significantly more "1" s than "0" s, then ~TP 808 may include significantly more "0" s than "1" s. Further, if ~TP 808 includes significantly more "0" s than "1" s, then TP 806 may include significantly more "1" s than "0" s. Conversely, if ~TP 808 includes significantly more "1" s than "0" s, then TP 806 may include significantly more "0" s than "1" s. The order of "0" s and "1" s in TP 806 and ~TP 808 may be unrestricted. Consequently, the probability of TP 806 and ~TP 808 matching a random data sequence is high enough to be practical for use of $EFP_1$ 802 or $EFP_0$ 804, even when the length of TP 806 and ~TP 808 is long.

The magnitude of the aggregate ISI may increase as the disparity between the number of "0" s and "1" s in TP 806 and ~TP 808 grows. Further, the accuracy of measuring the aggregate ISI may increase as the greater disparity between the number of "0" s and "1" s in TP 806 and ~TP 808 grows. However, the greater disparity that is required to match TP 806 and ~TP 808 between the number of "0" s and "1" s, the probability of TP 806 and ~TP 808 matching in a random data sequence decreases. Therefore, TP 806 and ~TP 808 may include a trade-off between accuracy and speed of ISI measurement. The selection of a given threshold for the relative number of "0" s and "1" s in TP 806 and ~TP 808 may be made balancing these considerations. In one embodiment, TP 806 and ~TP 808 may specify a 10, 15, 20, 22, 25, 28, or 30 percent difference in the number of "0" s and "1" s.

MP 810 may be configured to cancel the effect of non-long-term ISI and to separate TP 806 and ~TP 808 from E 814 sufficiently such that only long-term ISI is detected, while keeping the probability of detecting the pattern in a random data sequence high enough to be practical. In at least one embodiment, MP 810 may be omitted if TP 806 and ~TP 808 directly precede FP 812.

FP 812 may be configured to accurately cancel the effect of short-term ISI, which may be significant relative to long-term ISI. In at least one embodiment, FP 812 may be omitted if the location of E 814 is located near the end of MP 810. In at least one embodiment, both FP 812 and MP 810 may be omitted by causing detection of E 814 near the end of TP 806 and ~TP 808.

Figure 9:
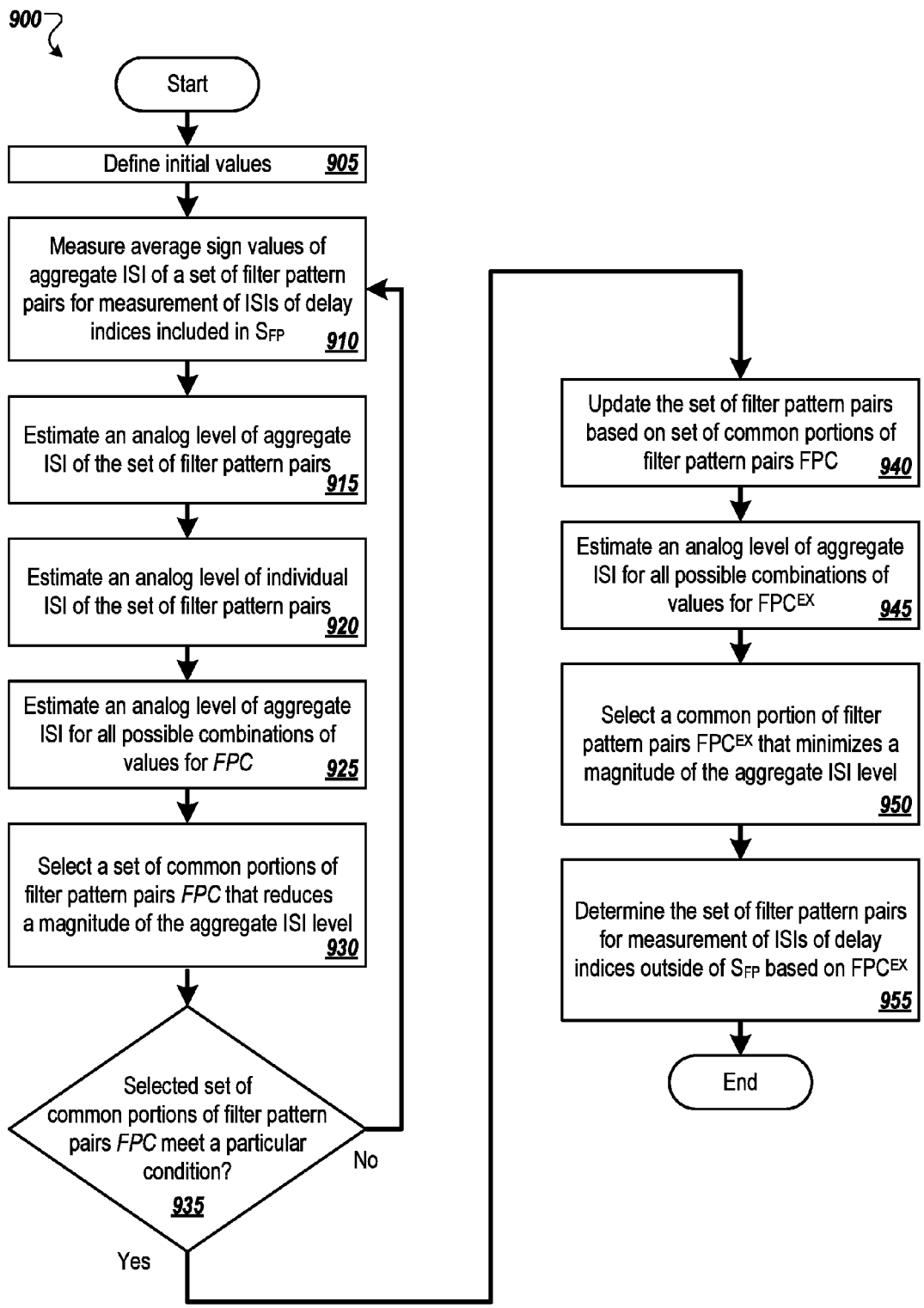
FIG. 9 illustrates a flow diagram of an example method to select one or more filter patterns.

FIG. 9 illustrates a flow diagram of a method 900 to select one or more filter patterns that may be used to measure ISI. The method 900 may be performed by processing logic that may include hardware (circuitry, dedicated logic, etc.), software (such as is run on a general purpose computer system or a dedicated machine), or a combination of both, which processing logic may be included in the filter pattern optimizer 110 of FIG. 1 or another computer system or device. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

At block 905, the processing logic may define initial values in preparation for filter pattern selection and/or optimization. In at least one embodiment, the processing logic may define $S_{FP}$ that may be a set of delay index values. A delay index value in the $S_{FP}$ may represent a delay from reception of data to reception of error. At a delay index value in the $S_{FP}$, a data value of filter pattern to be matched with incoming data sequence may be defined. $S_{FP}$ may include a set of several delay index values. In at least one embodiment, the processing logic may define initial values for multiple pairs of filter patterns. The initial values may include a set of data values to be matched with incoming data sequence at delay index values defined in $S_{FP}$. In at least one embodiment, the number of delay index values in $S_{FP}$ may be large enough to cover significant effects of ISIs. In at least one embodiment, $S_{FP}$ may include several continuous positive delay index values and a few continuous negative delay index values. The processing logic may also define the same number of filter pattern pairs as the number of delay index values in $S_{FP}$ and may assign a common portion of a filter pattern pair (FPC) (e.g., the data values that may be the common part of the two filter patterns, $D_0$, $D_1$, $D_2$, $D_4$, $D_5$ and $D_6$ in FIG. 4) with arbitrary initial values that may be changed during the filter pattern selection method 900. In at least one embodiment, to prevent statistical saturation of the binary error values, FPC may be assigned with initial values that may have approximately equal number of high values and low values. In at least one embodiment, to prevent statistical saturation of the binary error values, FPC may be assigned with initial values that may alternate between positive value and negative value by the delay index value as:

$$FPC_\kappa^{(i)} = (-1)^\kappa$$

where $i \; (\in S_{FP})$ may be a variable of a delay index value of ISI to be measured with the filter pattern pair, $\kappa (\in S_{FP})$ may be a variable of a delay index value of data value in the filter pattern to be matched with incoming data sequence, and $FPC_\kappa^{(i)}$ may be a data value of delay $\kappa$ in the common portion of the filter pattern pair used for measurement of ISI at delay i. The initial values for the common portions of the filter pattern pairs, FPCs, may be stored in a table, such as table 1002 of FIG. 10. In at least one embodiment, i may also be an index number of filter pattern decoders in an equalizer-control logic (e.g., filter-pattern decoder 505 in equalizer-control logic 500 of FIG. 5). In at least one embodiment, $\kappa$ may also be an index number of output of shift register 706 of filter pattern decoder 700 of FIG. 7.

At block 910, the processing logic may measure average sign values (e.g., +1, −1) of aggregate ISI in a data sequence based on a set of filter-pattern pairs. As an example, the set of filter pattern pairs may include filter pattern pairs, $FP1^{(i)}$ and $FP0^{(i)}$. In at least one embodiment, the filter pattern pairs $FP1^{(i)}$ and $FP0^{(i)}$ may be defined as:

$$FP1_\kappa^{(i)} = \begin{cases} +1 & (\kappa = i) \\ FPC_\kappa^{(i)} & (\kappa \neq i) \end{cases}$$

-continued $$FP0_\kappa^{(i)} = \begin{cases} -1 & (\kappa = i) \\ FPC_\kappa^{(i)} & (\kappa \neq i) \end{cases}$$

where $FP1_\kappa^{(i)}$ and $FP0_\kappa^{(i)}$ may be a pair of data values to be matched with an incoming data sequence by the filter pattern pair, $i \; (\in S_{FP})$ may be a variable of a delay index value (e.g., ranging from 1-4) of ISI to be measured with the filter pattern pair and $\kappa \; (\in S_{FP})$ may be a variable of delay index value (e.g., ranging from 1-4) of data value in the filter pattern pair to be matched with incoming data sequence.

In at least one embodiment, the average sign values of aggregate ISI measured by the filter pattern pair $FP1^{(i)}$ and $FP0^{(i)}$ may be represented as $\eta_{FP1}^{(i)}$ and $\eta_{FP0}^{(i)}$.

At block 915, the processing logic may estimate an analog level of aggregate ISI for the set of filter pattern pairs. The processing logic may use the average sign values of aggregate ISI measured by $FP1^{(i)}$ and $FP0^{(i)}$ to estimate the analog level of aggregate ISI for the set of filter pattern pairs. In at least one embodiment, the processing logic may estimate an analog level of aggregate ISI for the set of filter pattern pairs using an inverse error function and the average sign values of aggregate ISI measured by $FP1^{(i)}$ and $FP0^{(i)}$. In such embodiments, the analog level of aggregate ISI for $FP1^{(i)}$ and $FP0^{(i)}$ may be estimated as Q-factor (Quality factor) values of average sign values, which may be represented as:

$$q_{FP1}^{(i)} = \sqrt{2} \times erfinv(\eta_{FP1}^{(i)}),$$
$$q_{FP0}^{(i)} = \sqrt{2} \times erfinv(\eta_{FP0}^{(i)}),$$

where the "erfinv( )" is the inverse error function.

At block 920, the processing logic may estimate an analog level of individual ISI of the set of filter pattern pairs. In at least one embodiment, to estimate the analog level of individual ISI of the set of filter pattern pairs, the processing logic may estimate an analog level of individual ISI as a difference of Q-factor values between $FP1^{(i)}$ and $FP0^{(i)}$, which may be represented by the equation:

$$q_{FPD}^{(i)} = q_{FP1}^{(i)} - q_{FP0}^{(i)}.$$

At block 925, the processing logic may estimate an analog level of aggregate ISI for all possible combinations of values of $FPC_\kappa^{(i)}$, as further described in table 1002 of FIG. 10. Each $FPC_\kappa^{(i)}$ may use a value from $$\left\{-1 + \frac{2l}{L-1} \;\middle|\; l = 0, 1, \ldots, (L-1)\right\},$$

where L is the number of signal levels. For example, if the number of signal levels may be two, each $FPC_\kappa^{(i)}$ may use a value from $\{-1, +1\}$, and if the number of signal levels may be four, each $FPC_\kappa^{(i)}$ may use a value from $\{-1, -\frac{1}{3}, +\frac{1}{3}, +1\}$. The estimated analog levels of aggregate ISI for all possible combinations of values of $FPC_\kappa^{(i)}$ may be calculated as a sum of individual Q-factor values, which may be represented by the equation:

$$q_{\{FPC_\kappa^{(i)}\}} = \sum_{\kappa \in S_{FP}, \neq i} q_{FPD}^{(\kappa)} FPC_\kappa^{(i)}.$$

The processing logic may store each $q_{\{FPC_\kappa^{(i)}\}}$ value in association with which $FPC_\kappa^{(i)}$ was used to calculate the respective $q_{\{FPC_\kappa^{(i)}\}}$ in a data storage.

At block 930, the processing logic may select a set of common portions of filter pattern pairs $FPC_\kappa^{(i)}$ that reduces a magnitude of the aggregate ISI level. To identify a set of common portions of filter pattern pairs $FPC_\kappa^{(i)}$ that reduces a magnitude of the aggregate ISI level, the processing logic may examine each $q_{\{FPC_\kappa^{(i)}\}}$ to identify the aggregate ISI level with the smallest magnitude and may then identify which $FPC_\kappa^{(i)}$ was used to calculate the identified $q_{\{FPC_\kappa^{(i)}\}}$. The processing logic may select the value combination of the $FPC_\kappa^{(i)}$ that was used to calculate the $q_{\{FPC_\kappa^{(i)}\}}$ with the lowest magnitude.

At block 935, the processing logic may determine whether the selected set of common portions of filter pattern pairs $FPC_\kappa^{(i)}$ meets a particular condition. The particular condition may be a condition set by a system administrator so that the selected $FPC_\kappa^{(i)}$ may yield an acceptable result. For example, the particular condition may include a number of iterations that the processing logic has performed operations described in one or more of blocks 905-935 (e.g., 2 times, 10 times). In another example, the particular condition may include when the selected set of common portions of filter pattern pairs are the same as the previous iteration. In a further example, the particular condition may include when the selected set of common portions of filter pattern pairs are the same as two of the previous iterations. In yet another example, the particular condition may include when the selected set of common portions of filter pattern pairs are the same as at least one of the former iterations. When the particular condition is not met ("NO" a block 935), the processing logic may loop to block 910 to measure ISI in another data sequence using the updated values of common portions of filter pattern pairs.

When the particular condition is met ("YES" at block 935), at block 940, the processing logic may update the set of filter pattern pairs based on the selected set of common portions of filter pattern pairs. In at least one embodiment, updating the set of filter pattern pairs based on the selected set of common portions of filter pattern pairs includes updating the following values:

$$FP1_\kappa^{(i)} = \begin{cases} +1 & (\kappa = i) \\ FPC_\kappa^{(i)} & (\kappa \neq i) \end{cases}$$

$$FP0_\kappa^{(i)} = \begin{cases} -1 & (\kappa = i) \\ FPC_\kappa^{(i)} & (\kappa \neq i) \end{cases}$$

In at least one embodiment, the processing logic may also optimize a common portion of filter pattern pairs for measurement of ISIs of delay indices outside of $S_{FP}$. The common portion of filter pattern pairs for measurement of ISIs of delay indices outside of $S_{FP}$ may be defined for delay indices same as $S_{FP}$. In at least one embodiment, the common portion of filter pattern pairs for measurement of ISIs of delay indices outside of $S_{FP}$ may be represented by $FPC_\kappa^{EX}$, where $\kappa$ ($\in S_{FP}$) may be a variable of delay index value (e.g., ranging from 1-4) of data value in the common portion of filter pattern pairs to be matched with incoming data sequence. In at least one embodiment, the filter pattern pairs $FP1^{(j)}$ and $FP0^{(j)}$ for measurement of ISIs of delay indices outside of $S_{FP}$ may be defined based on $FPC_\kappa^{EX}$ as:

$$FP1_\kappa^{(j)} = \begin{cases} +1 & (\kappa = j \notin S_{FP}) \\ FPC_\kappa^{EX} & (\kappa \in S_{FP}) \end{cases}$$

$$FP0_\kappa^{(j)} = \begin{cases} -1 & (\kappa = j \notin S_{FP}) \\ FPC_\kappa^{EX} & (\kappa \in S_{FP}) \end{cases}$$

where $FP1_\kappa^{(j)}$ and $FP0_\kappa^{(j)}$ may be a pair of data values to be matched with incoming data sequence by the filter pattern pair, j ($\in S_{FP}$) may be a variable of a delay index value outside of $S_{FP}$ (e.g., 7) of ISI to be measured with the filter pattern pair, and $\kappa$ ($\in (S_{FP} \cup \{j\})$) may be a variable of a delay index value inside of $S_{FP}$ or the same as j (e.g., range from 1-4 and 7) of data value in the filter pattern pair to be matched with incoming data sequence.

At block 945, to optimize the common portion of filter pattern pairs $FPC_\kappa^{EX}$ for measurement of ISIs of delay indices outside of $S_{FP}$, the processing logic may estimate the analog level of aggregate ISI for all possible combinations of values of $FPC_\kappa^{EX}$ in a method similar to $FPC_\kappa^{(i)}$ described above at block 925. Each $FPC_\kappa^{EX}$ may use a value from $$\left\{ -1 + \frac{2l}{L-1} \,\middle|\, l = 0, 1, \ldots, (L-1) \right\},$$

where L is the number of signal levels. The estimated analog levels of aggregate ISI for all possible combinations of values of $FPC_\kappa^{EX}$ may be calculated as a sum of individual Q-factor values, which may be represented by the equation:

$$q_{\{FPC_\kappa^{EX}\}} = \sum_{\kappa \in S_{FP}} q_{FPD}^{(\kappa)} FPC_\kappa^{EX}.$$

The processing logic may store each $q_{\{FPC_\kappa^{EX}\}}$ value in association with which $FPC_\kappa^{EX}$ was used to calculate the respective $q_{\{FPC_\kappa^{EX}\}}$ in a data storage.

At block 950, the processing logic may select a common portion of filter pattern pairs $FPC_\kappa^{EX}$ that reduces a magnitude of the aggregate ISI level. To identify a common portion of filter pattern pairs $FPC_\kappa^{EX}$ that reduces a magnitude of the aggregate ISI level, the processing logic may examine each $q_{\{FPC_\kappa^{EX}\}}$ to identify the aggregate ISI level with the smallest magnitude and may then identify which $FPC_\kappa^{EX}$ was used to calculate the identified $q_{\{FPC_\kappa^{EX}\}}$. The processing logic may select the value combination of the $FPC_\kappa^{EX}$ that was used to calculate the $q_{\{FPC_\kappa^{EX}\}}$ with the lowest magnitude.

At block 955, the processing logic may determine the filter pattern pairs $FP1^{(j)}$ and $FP0^{(j)}$ for measurement of ISIs of delay indices outside of $S_{FP}$ based on $FPC_\kappa^{EX}$ as:

$$FP1_\kappa^{(j)} = \begin{cases} +1 & (\kappa = j \notin S_{FP}) \\ FPC_\kappa^{EX} & (\kappa \in S_{FP}) \end{cases}$$

$$FP0_\kappa^{(j)} = \begin{cases} -1 & (\kappa = j \notin S_{FP}) \\ FPC_\kappa^{EX} & (\kappa \in S_{FP}) \end{cases}$$

where $FP1_\kappa^{(j)}$ and $FP0_\kappa^{(j)}$ may be a pair of data values to be matched with incoming data sequence by the filter pattern pair, $j$ ($\in S_{FP}$) may be a variable of a delay index value outside of $S_{FP}$ (e.g., 7) of ISI to be measured with the filter pattern pair, and $\kappa$ ($\in (S_{FP} \cup \{j\})$) may be a variable of delay index value inside of $S_{FP}$ or the same as j (e.g., range from 1-4 and 7) of data value in the filter pattern pair to be matched with incoming data sequence.

In at least one embodiment, the method 900 may be used to optimize extended filter patterns. For non-extended filter patterns, an occurrence probability of the patterns may decrease as the length of the filter pattern increases. As such, filter patterns may have a maximum length to ensure efficiency. Extended filter patterns, which are longer in length than non-extended filter patterns, may be used to measure long-term ISI. The length of an extended filter pattern may be determined as follows. Similar to a non-extended filter pattern, an extended filter pattern may initially be specified by a set of initial values. Each extended filter pattern may have values for: (a) a lowest delay index value of the duration of the data sequence to match with (KL), (b) a highest delay index value of the duration of the data sequence to match with (KH), (c) a matched value or a matched sign value MV), and (d) a least count of data to match with (ML). The length of the duration may be determined using the following equation: KN=KH−KL+1. When KN=1, then an extended filter pattern may be optimized in a similar manner as with non-extended filter patterns. When KN>1, then the extended filter pattern indicates the sign of data values to match in the MV value as well as the least count of data to match with, as indicated by the ML value. The MV value may sometimes be represented by either −1 or +1 and the ML value may be an integer value greater than KN/2. Once the values for the extended filter pattern are initialized, the optimization process may iteratively optimize the MV values in a similar manner to the optimization process described for non-extended filter patterns.

FIG. 10 illustrates an example data flow 1000 during filter pattern selection and/or optimization. As illustrated, the data flow includes a table 1002 that illustrates values of four different filter pattern pairs (i.e., 8 filter patterns) and associated values for different combinations of i and $\kappa$. The variables i and $\kappa$ may be any number. However, as illustrated, i is an index variable from 1-4 and $\kappa$=1,2,3,4. A first pair of filter patterns may be represented as $FP1^{(1)}$ and $FP0^{(1)}$, a second pair of filter patterns may be represented as $FP1^{(2)}$ and $FP0^{(2)}$, a third pair of filter patterns may be represented as $FP1^{(3)}$ and $FP0^{(3)}$, and a fourth pair of filter patterns may be represented as $FP1^{(4)}$ and $FP0^{(4)}$. In at least one embodiment, i is an index number of filter pattern decoders in an equalizer-control logic (e.g., filter pattern decoders 505 of equalizer-control logic 500 of FIG. 5).

Initially, the table 1002 may include a particular set of values for each of the pairs of filter patterns at different combinations of i and $\kappa$. For example, when i=1 and $\kappa$=1, the value of $FP1^{(1)}$=+1 and the value of $FP0^{(1)}$=−1, when i=1 and $\kappa$=2, the value of $FP1^{(1)}$ and $FP0^{(1)}$=$FPC_2^{(1)}$, when i=1 and $\kappa$=3, the value of $FP1^{(1)}$ and $FP0^{(1)}$=$FPC_3^{(1)}$, and when i=1 and $\kappa$=4, the value of $FP1^{(1)}$ and $FP0^{(1)}$=$FPC_4^{(1)}$, where the FPC is a common part of a filter pattern pair. As illustrated, when i=$\kappa$, the filter pair have respective values of +1 and −1. When i≠$\kappa$, each filter pattern pair shares the same value $-FPC_\kappa^{(i)}$.

For each value of i, processing logic may use the filter pattern values in the table 1002 to measure the average sign of the aggregate ISI, which may be represented as $\eta_{FP}^{(i)}$. For example, the average sign of the aggregate ISI for filter pattern $FP1^{(1)}$ at i=1 may be represented as $\eta_{Fp1}^{(1)}$ and the average sign of the aggregate ISI for filter pattern $FP0^{(1)}$ at i=1 may be represented as $\eta_{FP0}^{(1)}$. The processing logic may take many measurements on random data sequences using each filter pattern. In at least one embodiment, the sign value may be represented as +1 or −1. To determine the average sign of the aggregate ISI for each filter pattern, the processing logic may calculate an average of all of the measured "+1" signs and/or "−1" signs. The processing logic may store the average sign of the aggregate ISI for each filter pattern in a data storage. For each value of i, the processing logic may measure the sign of the aggregate ISI summed for all values of $\kappa$ together at the same time. For example, the average sign of the aggregate ISI for i=1 and summed for all values of $\kappa$=1, 2, 3, 4 may be used to determine the average sign of the aggregate ISI for $FP1^{(1)}$.

The processing logic may use the average sign of the aggregate ISI for each filter pattern to estimate an analog level of the aggregate ISI. The analog level of the aggregate ISI may be represented as $q_{FP}^{(i)}$. The processing logic may estimate the analog level of the aggregate ISI for each filter pattern as Q-factor values using the following equations:

$$q_{FP1}^{(i)} = \sqrt{2} \times \mathrm{erfinv}(\eta_{FP1}^{(i)}),$$

$$q_{FP0}^{(i)} = \sqrt{2} \times \mathrm{erfinv}(\eta_{FP0}^{(i)}),$$

where the "erfinv( )" is the inverse error function. The processing logic may store the estimated analog level of the aggregate ISI for each filter pattern in a data storage.

The processing logic may use the analog level of the aggregate ISI for each filter pattern to estimate an analog level of individual ISI for each filter pattern pair, which may be represented as $q_{FPD}^{(i)}$. In at least one embodiment, the processing logic may calculate a difference (e.g., subtracts) between the Q-factor values for a filter pattern pair (e.g., $q_{FP1}^{(i)} - q_{FP0}^{(i)}$) to estimate the analog level of individual ISI.

The processing logic may iterate through the table 1002 to determine analog levels $q_{FPD}^{(i)}$ of individual ISI for each filter pattern pair in the table 1002. The processing logic may store the analog levels of individual ISI for each filter pattern pair in a data storage.

The processing logic may use the analog level of individual ISI for each filter pattern pair, $q_{FPD}^{(i)}$, to optimize common portions of the filter pattern pairs in the table 1002, as further described in conjunction with FIG. 10. When the processing logic determines FPC that are more optimal than those listed in table 1002, the processing logic may replace the FPC values in the table 1002 with the more optimal values for FPC. In at least one embodiment, an analog level of individual ISI of a filter pattern pair $FP1^{(i)}$ and $FP0^{(i)}$ may be used to optimize the $FPC_\kappa^{(i)}$ at $\kappa$=i. For example, the analog level of individual ISI calculated for the filter pattern pair $FP1^{(2)}$ and $FP0^{(2)}$ for i=2, $q_{FPD}^{(2)}$, may be used to optimize the $FPC_\kappa^{(i)}$ at $\kappa$=2, i.e. $FPC_2^{(1)}$, $FPC_2^{(3)}$, and $FPC_2^{(4)}$. In at least one embodiment, an analog level of individual ISI of a filter pattern pair $FP1^{(i)}$ and $FP0^{(i)}$ may not be used to optimize the $FPC_\kappa^{(i)}$ at $\hat{\iota}$ being the same value as i. For example, the analog level of individual ISI calculated for the filter pattern pair $FP1^{(1)}$ and $FP0^{(1)}$ for i=1, $q_{FPD}^{(1)}$, may not be used to optimize $FPC_\kappa^{\hat{\iota}}$ at $\hat{\iota}$=1, i.e. $FPC_2^{(1)}$, $FPC_2^{(1)}$, or $FPC_4^{(1)}$.

The processing logic may repeat the example data flow 1000 any number of times, where the table 1002 may be updated after each iteration.

Figure 11:
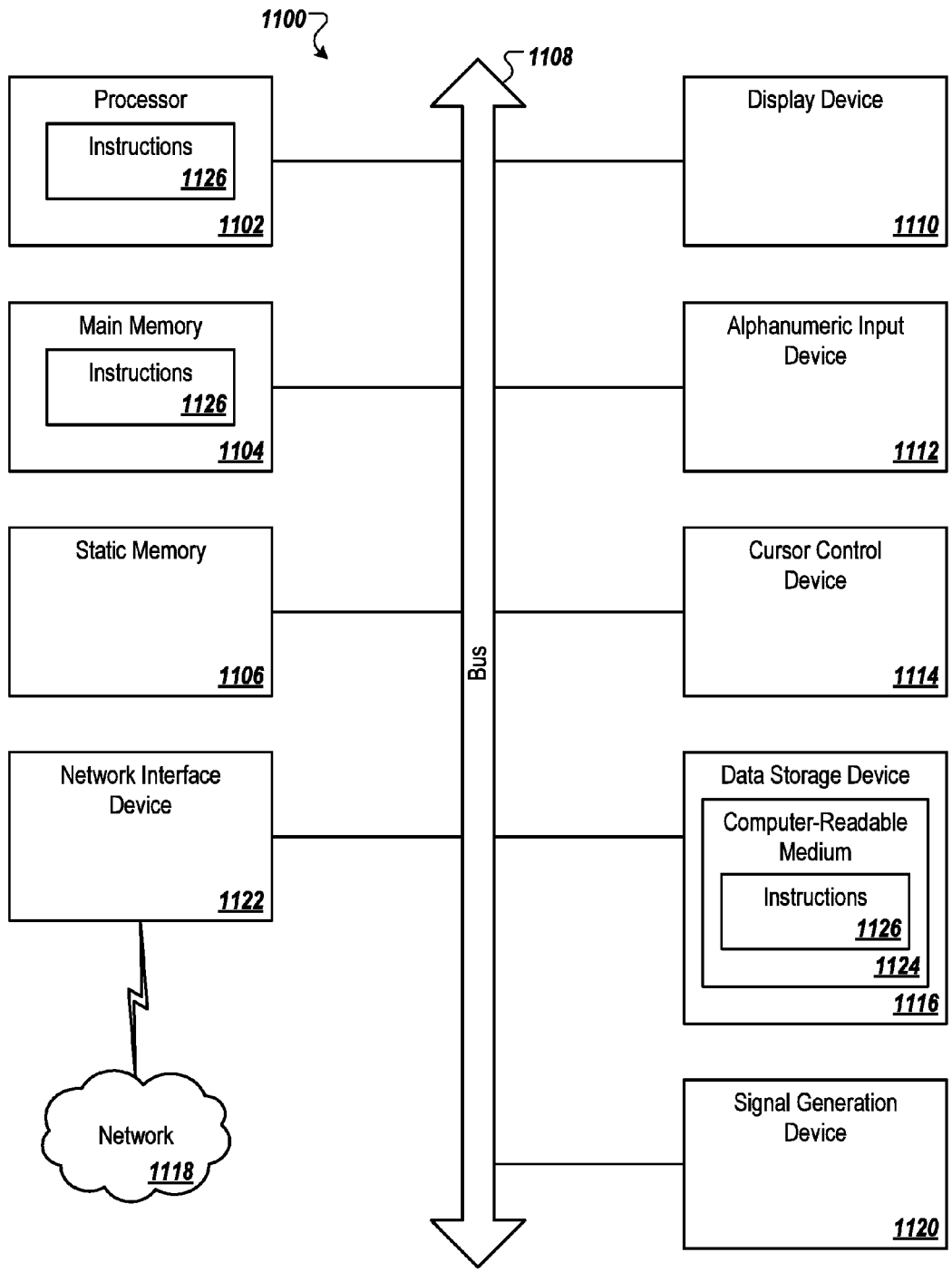
FIG. 11 illustrates a block diagram of an example computer system to select filter patterns, all according to at least one embodiment of the present disclosure.

FIG. 11 illustrates a block diagram of an example computer system 1100 to select filter patterns, according to at least one embodiment of the present disclosure. The adaptive control system 100 of FIG. 1 may be implemented as a computing system such as the example computer system 1100. The computer system 1100 may be configured to implement one or more operations of the present disclosure.

The computer system 1100 executes one or more sets of instructions 1126 that cause the machine to perform any one or more of the methodologies discussed herein. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 1126 to perform any one or more of the methodologies discussed herein.

The computer system 1100 may include a processor 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1116, which communicate with each other via a bus 1108.

The processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1102 may also be one or more special-purpose processing devices such as an application specific integrated circuit (ASIC), a field programmable gate array (FPGA), a digital signal processor (DSP), network processor, or the like. The processor 1102 is configured to execute instructions for performing the operations and steps discussed herein.

The computer system 1100 may further include a network interface device 1122 that provides communication with other machines over a network 1118, such as a local area network (LAN), an intranet, an extranet, or the Internet. The network interface device 1122 may include any number of physical or logical interfaces. The network interface device 1122 may include any device, system, component, or collection of components configured to allow or facilitate communication between network components in a network. For example, the network interface device 1122 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a WiFi device, a WiMax device, cellular communication facilities, etc.), and/or the like. The network interface device 1122 may permit data to be exchanged with a network (such as a cellular network, a WiFi network, a MAN, an optical network, etc., to name a few examples) and/or any other devices described in the present disclosure, including remote devices. In at least one embodiment, the network interface device 1122 may be logical distinctions on a single physical component, for example, multiple communication streams across a single physical cable or optical signal.

The computer system 1100 also may include a display device 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The data storage device 1116 may include a computer-readable storage medium 1124 on which is stored the sets of instructions 1126 embodying any one or more of the methodologies or functions described herein. The sets of instructions 1126 may also reside, completely or at least partially, within the main memory 1104 and/or within the processor 1102 during execution thereof by the computer system 1100, the main memory 1104 and the processor 1102 also constituting computer-readable storage media. The sets of instructions 1126 may further be transmitted or received over the network 1118 via the network interface device 1122.

While the example of the computer-readable storage medium 1124 is shown as a single medium, the term "computer-readable storage medium" may include a single medium or multiple media (e.g., a centralized or distributed database, and/or associated caches and servers) that store the sets of instructions 1126. The term "computer-readable storage medium" may include any medium that is capable of storing, encoding or carrying a set of instructions for execution by the machine and that cause the machine to perform any one or more of the methodologies of the present disclosure. The term "computer-readable storage medium" may include, but not be limited to, solid-state memories, optical media, and magnetic media.

Modifications, additions, or omissions may be made to the computer system 1100 without departing from the scope of the present disclosure. For example, in at least one embodiment, the computer system 1100 may include any number of other components that may not be explicitly illustrated or described.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In at least one embodiment, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations may be made hereto without departing from the spirit and scope of the present disclosure.

What is claimed is:

1. A method of filter pattern selection, the method comprising:
    defining a set of initial values for a set of filter pattern pairs, wherein the set of initial values define a plurality of filter pattern combinations for each filter pattern in the set of filter pattern pairs;
    measuring (a) a first average sign value of aggregate inter-symbol interference (ISI) for a first data sequence using a first plurality of filter pattern combinations of a first filter pattern, and (b) a second average sign value of aggregate ISI for a second data sequence using a second plurality of filter pattern combinations of a second filter pattern, wherein the first filter pattern and the second filter pattern comprise a first filter pattern pair;
    estimating (a) a first analog level of aggregate ISI for the first filter pattern based on the first average sign value, and (b) a second analog level of aggregate ISI for the second filter pattern based on the second average sign value;
    estimating an analog level of individual ISI of the first filter pattern pair based on the first analog level of aggregate ISI for the first filter pattern and the second analog level of aggregate ISI for the second filter pattern;
    estimating, for each possible filter pattern combination, an analog level of aggregate ISI for the first filter pattern pair; and
    selecting a filter pattern combination to be used with the first filter pattern pair to reduce the analog level of aggregate ISI for the first filter pattern pair.

2. The method of claim 1 further comprising:
    determining whether the selected filter pattern combination for the first filter pattern pair meets a particular condition;
    when the particular condition is met, updating the set of initial values based on the selected filter pattern combination for the first filter pattern pair; and
    when the particular condition is not met, measuring the first average sign value of aggregate ISI for another data sequence.

3. The method of claim 1, wherein estimating the first analog level of aggregate ISI for the first filter pattern based on the first average sign value comprises calculating the first analog level of aggregate ISI for the first filter pattern using an inverse error function of the first average sign value, and
    wherein estimating the second analog level of aggregate ISI for the second filter pattern based on the second average sign value comprises calculating the second analog level of aggregate ISI for the second filter pattern using the inverse error function of the second average sign value.

4. The method of claim 1, wherein estimating the analog level of individual ISI of the first filter pattern pair based on the first analog level of aggregate ISI for the first filter pattern and the second analog level of aggregate ISI for the second filter pattern comprises calculating a difference between the first analog level of aggregate ISI for the first filter pattern and the second analog level of aggregate ISI for the second filter pattern.

5. The method of claim 1, wherein the filter pattern is an extended filter pattern to detect long-term ISI.

6. The method of claim 1, wherein the set of filter pattern pairs comprises the first filter pattern pair and a second filter pattern pair, the second filter pattern pair includes a third filter pattern and a fourth filter pattern, the method further comprising:
    measuring (a) a third average sign value of aggregate ISI for a third data sequence using a third plurality of filter pattern combinations of the third filter pattern, and (b) a fourth average sign value of aggregate ISI for a fourth data sequence using a fourth plurality of filter pattern combinations of the fourth filter pattern;
    estimating (a) a third analog level of aggregate ISI for the third filter pattern based on the third average sign value, and (b) a fourth analog level of aggregate ISI for the fourth filter pattern based on the fourth average sign value; and
    estimating a second filter pattern pair analog level of individual ISI based on the third analog level of aggregate ISI for the third filter pattern and the fourth analog level of aggregate ISI for the fourth filter pattern.

7. The method of claim 6, wherein estimating, for each possible filter pattern combination, the analog level of aggregate ISI for the first filter pattern pair is based on the second filter pattern pair analog level of individual ISI.

8. A non-transitory computer-readable medium containing instructions that, when executed by a processor, are configured to cause the processor to perform operations, the operations comprising:
   defining a set of initial values for a set of filter pattern pairs, wherein the set of initial values define a plurality of filter pattern combinations for each filter pattern in the set of filter pattern pairs;
   measuring (a) a first average sign value of aggregate inter-symbol interference (ISI) for a first data sequence using a first plurality of filter pattern combinations of a first filter pattern, and (b) a second average sign value of aggregate ISI for a second data sequence using a second plurality of filter pattern combinations of a second filter pattern, wherein the first filter pattern and the second filter pattern comprise a first filter pattern pair;
   estimating (a) a first analog level of aggregate ISI for the first filter pattern based on the first average sign value, and (b) a second analog level of aggregate ISI for the second filter pattern based on the second average sign value;
   estimating an analog level of individual ISI of the first filter pattern pair based on the first analog level of aggregate ISI for the first filter pattern and the second analog level of aggregate ISI for the second filter pattern;
   estimating, for each possible filter pattern combination, an analog level of aggregate ISI for the first filter pattern pair; and
   selecting a filter pattern combination to be used with the first filter pattern pair to reduce the analog level of aggregate ISI for the first filter pattern pair.

9. The non-transitory computer-readable medium of claim 8, wherein the operations further comprise:
   determining whether the selected filter pattern combination for the first filter pattern pair meets a particular condition;
   when the particular condition is met, updating the set of initial values based on the selected filter pattern combination for the first filter pattern pair; and
   when the particular condition is not met, measuring the first average sign value of aggregate ISI for another data sequence.

10. The non-transitory computer-readable medium of claim 8, wherein estimating the first analog level of aggregate ISI for the first filter pattern based on the first average sign value comprises calculating the first analog level of aggregate ISI for the first filter pattern using an inverse error function of the first average sign value, and
   wherein estimating the second analog level of aggregate ISI for the second filter pattern based on the second average sign value comprises calculating the second analog level of aggregate ISI for the second filter pattern using the inverse error function of the second average sign value.

11. The non-transitory computer-readable medium of claim 8, wherein estimating the analog level of individual ISI of the first filter pattern pair based on the first analog level of aggregate ISI for the first filter pattern and the second analog level of aggregate ISI for the second filter pattern comprises calculating a difference between the first analog level of aggregate ISI for the first filter pattern and the second analog level of aggregate ISI for the second filter pattern.

12. The non-transitory computer-readable medium of claim 8, wherein the filter pattern is an extended filter pattern to detect long-term ISI.

13. The non-transitory computer-readable medium of claim 8, wherein the set of filter pattern pairs comprises the first filter pattern pair and a second filter pattern pair, the second filter pattern pair includes a third filter pattern and a fourth filter pattern, the operations further comprising:
   measuring (a) a third average sign value of aggregate ISI for a third data sequence using a third plurality of filter pattern combinations of the third filter pattern, and (b) a fourth average sign value of aggregate ISI for a fourth data sequence using a fourth plurality of filter pattern combinations of the fourth filter pattern;
   estimating (a) a third analog level of aggregate ISI for the third filter pattern based on the third average sign value, and (b) a fourth analog level of aggregate ISI for the fourth filter pattern based on the fourth average sign value; and
   estimating a second filter pattern pair analog level of individual ISI based on the third analog level of aggregate ISI for the third filter pattern and the fourth analog level of aggregate ISI for the fourth filter pattern.

14. The non-transitory computer-readable medium of claim 13, wherein estimating, for each possible filter pattern combination, the analog level of aggregate ISI for the first filter pattern pair is based on the second filter pattern pair analog level of individual ISI.

15. A device comprising:
   a memory storing instructions, and
   a processor operatively coupled to the memory, the processor being configured to execute the instructions that cause the processor to perform operations, the operations comprising:
      define a set of initial values for a set of filter pattern pairs, wherein the set of initial values define a plurality of filter pattern combinations for each filter pattern in the set of filter pattern pairs;
      measure (a) a first average sign value of aggregate inter-symbol interference (ISI) for a first data sequence using a first plurality of filter pattern combinations of a first filter pattern, and (b) a second average sign value of aggregate ISI for a second data sequence using a second plurality of filter pattern combinations of a second filter pattern, wherein the first filter pattern and the second filter pattern comprise a first filter pattern pair;
      estimate (a) a first analog level of aggregate ISI for the first filter pattern based on the first average sign value, and (b) a second analog level of aggregate ISI for the second filter pattern based on the second average sign value;
      estimate an analog level of individual ISI of the first filter pattern pair based on the first analog level of aggregate ISI for the first filter pattern and the second analog level of aggregate ISI for the second filter pattern;
      estimate, for each possible filter pattern combination, an analog level of aggregate ISI for the first filter pattern pair; and
      select a filter pattern combination to be used with the first filter pattern pair to reduce the analog level of aggregate ISI for the first filter pattern pair.

16. The device of claim 15, wherein the processor is further configured to:

determine whether the selected filter pattern combination for the first filter pattern pair meets a particular condition;

when the particular condition is met, update the set of initial values based on the selected filter pattern combination for the first filter pattern pair; and when the particular condition is not met, measure the first average sign value of aggregate ISI for another data sequence.

17. The device of claim 15, wherein when estimating the first analog level of aggregate ISI for the first filter pattern based on the first average sign value, the processor is configured to calculate the first analog level of aggregate ISI for the first filter pattern using an inverse error function of the first average sign value, and wherein when estimating the second analog level of aggregate ISI for the second filter pattern based on the second average sign value, the processor is configured to calculate the second analog level of aggregate ISI for the second filter pattern using the inverse error function of the second average sign value.

18. The device of claim 15, wherein when estimating the analog level of individual ISI of the first filter pattern pair based on the first analog level of aggregate ISI for the first filter pattern and the second analog level of aggregate ISI for the second filter pattern, the processor is configured to calculate a difference between the first analog level of aggregate ISI for the first filter pattern and the second analog level of aggregate ISI for the second filter pattern.

19. The device of claim 15, wherein the set of filter pattern pairs comprises the first filter pattern pair and a second filter pattern pair, the second filter pattern pair includes a third filter pattern and a fourth filter pattern, the processing being further configured to:

measure (a) a third average sign value of aggregate ISI for a third data sequence using a third plurality of filter pattern combinations of the third filter pattern, and (b) a fourth average sign value of aggregate ISI for a fourth data sequence using a fourth plurality of filter pattern combinations of the fourth filter pattern;

estimate (a) a third analog level of aggregate ISI for the third filter pattern based on the third average sign value, and (b) a fourth analog level of aggregate ISI for the fourth filter pattern based on the fourth average sign value; and estimate a second filter pattern pair analog level of individual ISI based on the third analog level of aggregate ISI for the third filter pattern and the fourth analog level of aggregate ISI for the fourth filter pattern.

20. The device of claim 19, wherein when estimating, for each possible filter pattern combination, the analog level of aggregate ISI for the first filter pattern pair, the processor is to perform estimation based on the second filter pattern pair analog level of individual ISI.

* * * * *